United States Patent [19]
Cerny

[11] Patent Number: 5,575,728
[45] Date of Patent: Nov. 19, 1996

[54] DRIVE ASSEMBLY WITH INTERFERENCE-FIT MOUNTED PULLEY

[75] Inventor: Zdenek Cerny, Rexdale, Canada

[73] Assignee: Tesma International, Inc., Concord, Canada

[21] Appl. No.: 412,306

[22] Filed: Mar. 29, 1995

[51] Int. Cl.$^6$ ..................................................... F16H 55/49
[52] U.S. Cl. ........................... 474/170; 474/902; 474/903
[58] Field of Search ..................................... 474/168, 170, 474/902, 903

[56] References Cited

U.S. PATENT DOCUMENTS

| | | | |
|---|---|---|---|
| 2,738,681 | 3/1956 | Schultz | 474/902 X |
| 3,069,919 | 12/1962 | Schultz | 474/902 X |
| 4,231,265 | 11/1980 | Hanisch et al. | 474/903 X |
| 4,468,210 | 8/1984 | McCutchan | 474/170 |
| 4,473,363 | 9/1984 | McCutchan | 474/168 X |
| 4,626,231 | 12/1986 | Nagano | 474/903 X |
| 4,824,423 | 4/1989 | Jocic | 474/170 |

*Primary Examiner*—Roger J. Schoeppel
*Attorney, Agent, or Firm*—Cushman Darby & Cushman, L.L.P.

[57] ABSTRACT

A drive assembly for rotating a shaft of a pulley driven device. The drive assembly includes a hub in the form of an annular body of ferrous metal having a groove in an external periphery thereof. A belt driven pulley is provided in the form of ferrous sheet metal and has a web portion. A structural connection is defined between the hub and the pulley web portion such that the hub is in fixed, abutted relation with the pulley web portion. The hub and the pulley web portion have a bore therethrough defining a single, machined annular surface. The annular surface is constructed and arranged to engage a periphery of the shaft in an interference-fitted manner so as to maintain torque transfer to the shaft in the event of failure of the structural connection. The groove is constructed and arranged to be operatively engaged by a pulling tool for removing the annular surface from engagement with the shaft.

15 Claims, 2 Drawing Sheets

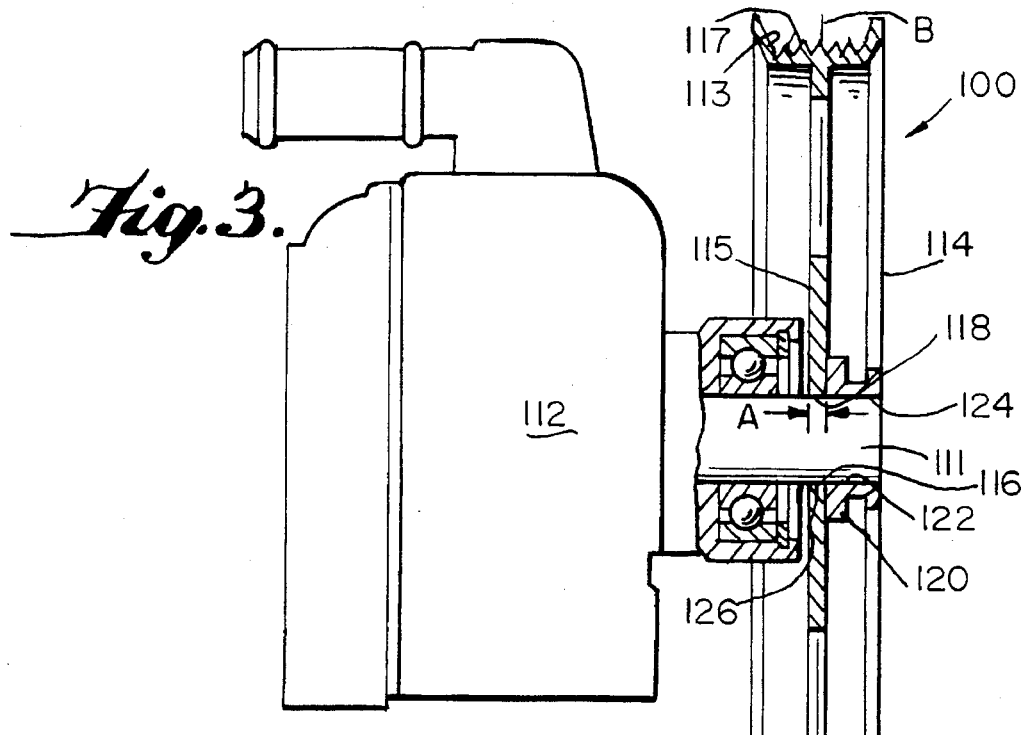
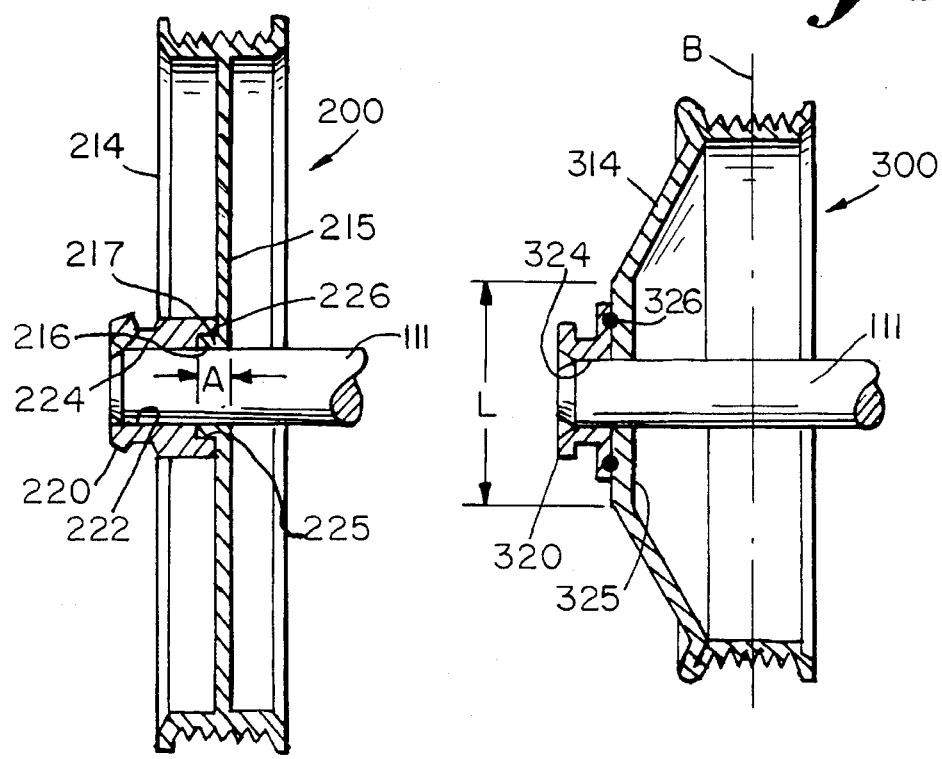

DRIVE ASSEMBLY WITH INTERFERENCE-FIT MOUNTED PULLEY

BACKGROUND OF THE INVENTION

The invention relates to a drive assembly for moving a drive shaft of a vehicle accessory and, more particularly, to a drive assembly having a hub and a belt-driven pulley which are mounted in interference-fitted relation to the drive shaft.

Many vehicle accessories, such as a hydraulic steering pump, water pump, air injection pump and alternator, are operated by a belt-driven pulley which is attached to the drive shaft of the accessory through a joint capable of transferring a required torque and belt tension load.

With reference to FIG. 1, the conventional arrangement comprises a drive assembly 10 including a hub 12 machined of steel and sized to be press-fitted onto the drive shaft 14 of the accessory 16. A web portion of a belt-driven, sheet metal pulley 18 is affixed to the separate hub 12 at joint 20 by welding, brazing or the like.

In these conventional arrangements, the brazed or welded joint 20 between the hub 12 and the pulley 18 is a potential safety hazard. In the event of joint failure, there is immediate disconnection between the drive shaft 14 and the web portion of the pulley 18. This problem is especially hazardous when the accessory 16 is a power steering pump whereby failure to deliver adequate rotation of the hydraulic shaft results in hydraulic pressure loss which may lead to a sudden increase in steering effort, creating a potentially hazardous condition.

U.S. Pat. No. 4,824,423 discloses a pulley-hub assembly, comprised of two non-machined, sheet metal axial parts, which was intended to provide the operational characteristics of the conventional drive assembly 10 of FIG. 1, at a reduced cost. As shown in FIG. 2, the assembly of U.S. Pat. No. 4,824,423 comprises a pulley 40 having a web or circular wall portion 52 and an axially extending cylindrical wall portion 58 formed integrally from sheet metal defining a cylindrical surface 62. A hub 56 includes an axially extending cylindrical wall portion 64 formed of sheet metal and defining a cylindrical surface 68. An annular flange 66 of the hub is welded to a wall portion 52 of the pulley. However, in certain circumstances, the thin, sheet metal cylindrical wall portions 58 and 64 may exhibit inadequate rigidity in use, and, as a result, do not provide adequate retention at the pulley-shaft connection in the event of failure of the pulley-hub connection. Thus, the construction of this conventional pulley-hub assembly does not provide a solution to the above-mentioned problem.

Accordingly, a need exists to improve a two-part drive assembly so as to satisfy all the current requirements with respect to reliability, safety, reduced weight and cost, and improved overall quality in manufacturing.

SUMMARY OF THE INVENTION

An object of the present invention is to fulfill the need expressed above. In accordance with the principles of the present invention, this objective is accomplished by providing a drive assembly for a rotating a shaft of a belt driven device. The drive assembly includes a hub in the form of an annular body of ferrous metal having a groove in an external periphery thereof. A belt driven pulley is provided in the form of ferrous sheet metal and includes a web portion. A structural connection is defined between the hub and the pulley web portion such that the hub is in fixed, abutted relation with the pulley web portion. The hub and the pulley web portion have a bore therethrough defining a single, machined annular surface. The annular surface is constructed and arranged to engage a periphery of the shaft in an interference-fitted manner so as to maintain torque transfer to the shaft in the event of failure of the structural connection. The groove is constructed and arranged to be operatively engaged by a pulling tool for removing the annular surface from engagement with the shaft.

In accordance with another aspect of the invention, a drive assembly is provided in combination with a vehicle hydraulic power steering pump. The power steering pump includes a drive shaft. The drive assembly includes a hub in the form of an annular body of ferrous metal having a groove in an external periphery thereof. A belt driven pulley is provided in the form of ferrous sheet metal and includes a web portion. A structural connection is defined between the hub and the pulley web portion such that the hub is in fixed, abutted relation with the pulley web portion. The hub and the pulley web portion have bores therethrough defining a single, machined annular surface. The annular surface engages a periphery of the drive shaft in an interference-fitted manner so as to maintain torque transfer to the drive shaft in the event of failure of the structural connection, thereby preventing hydraulic pressure drop. The groove is constructed and arranged to be operatively engaged by a pulling tool for removing the annular surface from engagement with the shaft.

In accordance with yet another aspect of the present invention, a method is provided for coupling a drive assembly to a drive shaft of a pulley driven device. The drive assembly includes a hub in the form of an annular body of ferrous metal having a groove in an external periphery thereof; a belt driven pulley in the form of ferrous sheet metal, the pulley including a web portion; a structural connection between the hub and the pulley web portion such that the hub is in fixed, abutted relation with the pulley web portion, the hub and the pulley web portion each having a bore therethrough. The method includes machining the hub and pulley web portion bores in a single machining operation to define an annular surface and coupling the drive assembly to the drive shaft such that the annular surface is in engagement with the drive shaft in an interference fitted manner.

These and other objects of the present invention will become more apparent during the course of the following detailed description and appended claims. The invention may best be understood with reference to the accompanying drawings wherein an illustrative embodiment is shown.

BRIEF DESCRIPTION OF THE DRAWINGS

FIG. 3 is a view of a vehicle accessory and drive assembly combination, in partial section, provided in accordance with the principles of the present invention, shown with a hub and a portion of a pulley of the assembly press-fitted to a drive shaft;

FIG. 4 is another embodiment of a drive assembly of the present invention; and

FIG. 5 is yet another embodiment of a drive assembly of the present invention having a fold-over type pulley.

DETAILED DESCRIPTION OF THE PRESENTLY PREFERRED EXEMPLARY EMBODIMENTS

Figure 1:
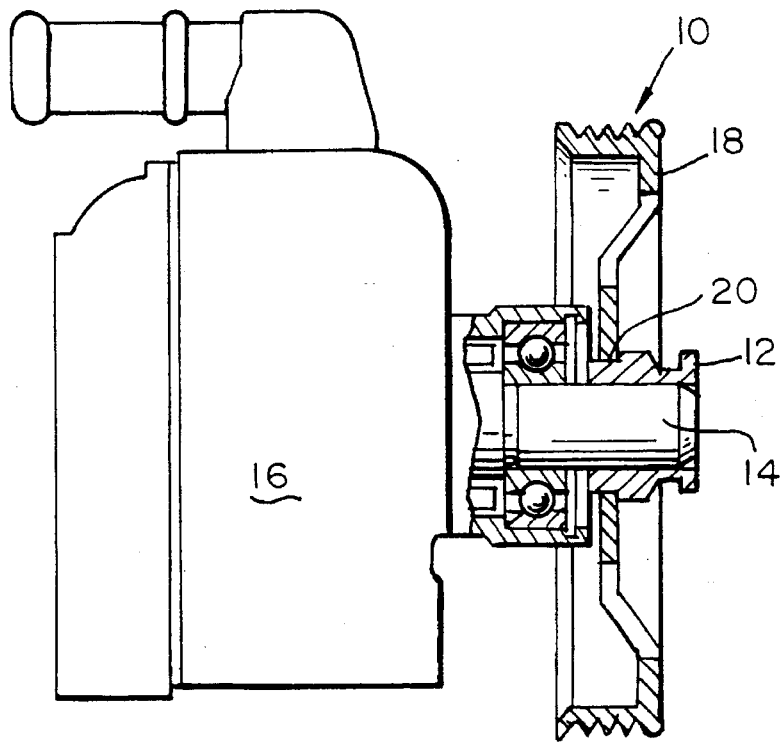
FIG. 1 is a cross-sectional view of a conventional vehicle accessory and drive assembly.
Figure 2:
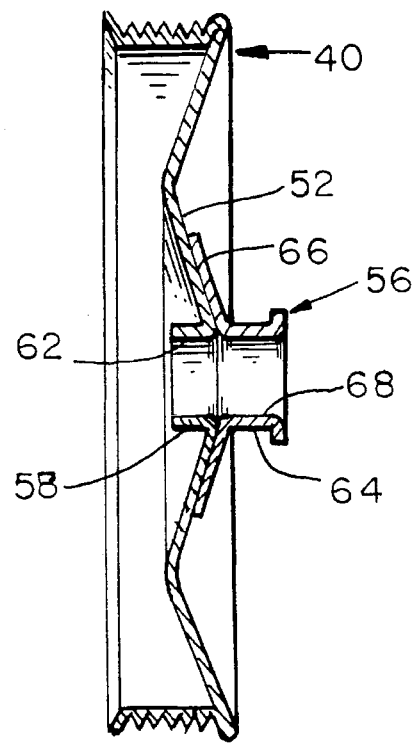
FIG. 2 is a cross-sectional view of another conventional drive assembly.

Referring to the drawings, a drive assembly is shown, generally indicated at 100, embodying the principles of the present invention. It can be appreciated that the drive assembly 100 may be used to drive any shaft driven device. However, in the embodiment illustrated in FIG. 3, the drive assembly is coupled to a drive shaft 111 of a vehicle accessory 112, such as a hydraulic steering pump, water pump, air injection pump or alternator. A hydraulic steering pump is shown in FIG. 3.

With reference to FIG. 3, the drive assembly 100 includes a preferably ferrous sheet metal pulley 114, of the type in which the outer pulley surface 113 is formed with a series of teeth 117 for use with tooth belt drive. A rigid web portion 115 of the pulley 114 is aligned with the pulley central axis B. The web portion 115 includes a machined axial bore 116 therethrough.

The drive assembly 100 also includes a rigid hub 120 in the form of an annular body of ferrous metal and preferably machined from bar stock or forged. The hub has an axial bore 122 therethrough. The hub 120 is preferably comprised of steel and is coupled to the web portion 115 of the metal pulley at structural connection 126 by, for example, welding, including laser, electron beam and MIG welding; brazing; mechanical attachment, such as riveting, staking, crimping or bolting; or by an adhesive. The connection 126 is such that the hub 120 is in a fixed, abutted relation with the pulley web portion 115.

In accordance with the invention, the bores 116 and 122 are machined. It is preferable to machine the bores 116 and 122 in a single machining operation after coupling the hub 120 to the pulley 114, so as to define a single, machined annular surface 124 of the joined hub and pulley. This ensures a proper interference fit of the annular surface with the shaft, as explained below.

In accordance with the present invention, the drive assembly 100 is coupled to the shaft 111 such that a press-fit or interference fit is created between annular surface 124 and the shaft 111, to transmit the required torque to the shaft 111.

As shown in FIG. 3, the engagement length A of pulley annular surface portion 118 with the shaft 111 is generally equal to the thickness of the web portion 115 of the pulley, which results in a high stress state in the web portion. This construction maintains the torque required for safe operation of the assembly even in the event of a possible failure of the connection which joins the web portion 115 of the pulley and the hub, which is not possible with the conventional assemblies.

FIG. 4 shows another embodiment of a drive assembly 200 of the present invention, wherein a web portion 215 of the pulley 214 has a bore 216 therethrough and an axially extending portion 217. The hub 220 includes an axial bore 222. As in the embodiment of FIG. 3, the bores 216 and 222 are machined in a single machining operation to define annular surface 224, which engages the shaft 111 in a press or interference fitted manner. The hub 220 includes a groove 225 for receiving the extending portion 217 of the pulley. Thus, due to the extending portion 217, the engagement length A of the pulley annular surface portion 218 is greater than that of the embodiment of FIG. 3, which reduces the stresses created in the structural connection 226 between the hub and the pulley.

FIG. 5 is another embodiment of a drive assembly 300 of the invention, having a fold-over type pulley wherein the web portion 315 is laterally offset from the pulley central axis B. Hub 320 is affixed to the pulley 314 at structural connection 326 in the manner discussed above. Further, annular surface 324, formed during a single machining operation, is engaged with shaft 111 in a press or interference fitted manner. As shown, the web portion includes a straight portion 325. To ensure adequate retention of the pulley-shaft connection, it is preferable that the length L of the straight portion 325 is not less than the maximum outer diameter of the hub 320.

Returning to FIG. 3, in certain circumstances, it is desirable to remove the drive assembly 100 from engagement with the shaft 111. Thus, the hub 120 has a groove 127 therein spaced inwardly from an end 129 thereof opposite end 131 which is coupled to the pulley 114. The groove 127 is constructed and arranged to be operatively engaged by a pulling tool for removing the annular surface 124 from engagement with the shaft 111 on which the hub and pulley have been engaged.

It can be appreciated that the engagement of the single, machined annular surface of the hub body and pulley with the shaft, provides a more rigid and reliable connection than the conventional two-part drive assemblies. Further, adequate static friction is ensured upon connecting the a portion of the pulley directly with the shaft. Such static friction is achieved by the high contour pressure derived from the rigid web portion.

It thus will be seen that the objects of this invention have been fully and effectively accomplished. It will be realized, however, that the foregoing preferred specific embodiments have been shown and described for the purpose of this invention and are subject to change without departure form such principles. Therefore, this invention includes all modifications encompassed within the spirit and scope of the following claims.

What is claimed is:

1. A drive assembly for rotating a shaft of a belt driven device, the drive assembly comprising:

a hub machined from stock material or forged in the form of an annular body of ferrous metal having a groove in an external periphery thereof, a belt driven pulley in the form of ferrous sheet metal, said pulley including a web portion, a structural connection between said hub and said pulley web portion such that said hub is in fixed, abutted relation with said pulley web portion, said hub and said pulley web portion each having a bore therethrough, each said bore cooperating to define a single, machined annular surface, said annular surface being constructed and arranged to engage a periphery of the shaft in an interference-fitted manner so as to maintain torque transfer to the shaft in the event of failure of said structural connection, said groove being constructed and arranged to be operatively engaged by a pulling tool for removing said annular surface from engagement with the shaft.

2. The drive assembly according to claim 1, wherein an engagement length of said pulley web portion with the shaft is generally equal to a thickness of said pulley web portion.

3. The device assembly according to claim 1, wherein said pulley web portion includes an extending portion extending in the shaft axial direction and having said bore therethrough, thereby increasing an engagement area between the pulley and the shaft.

4. The drive assembly according to claim 1, wherein said structural connection is one of a welded and brazed connection.

5. The drive assembly according to claim 1, wherein said structural connection is one of a mechanical and adhesive connection.

6. The drive assembly according to claim 1, wherein said web portion is aligned with a pulley central axis.

7. The drive assembly according to claim 1, wherein said web portion is offset laterally from a pulley central axis.

8. The drive assembly according to claim 1, wherein an outer pulley surface is formed with a series of teeth for use with tooth belt drive.

9. A drive assembly in combination with a vehicle hydraulic power steering pump, the power steering pump including a drive shaft, said drive assembly comprising:

a hub machined from stock material or forged in the form of an annular body of ferrous metal having a groove in an external periphery thereof, a belt driven pulley in the form of ferrous sheet metal, said pulley including a web portion, a structural connection between said hub and said pulley web portion such that said hub is in fixed, abutted relation with said pulley web portion, said hub and said pulley web portion each having a bore therethrough each said bore cooperating to define a single, machined annular surface, said annular surface engaging a periphery of the drive shaft in an interference-fitted manner so as to maintain torque transfer to the drive shaft in the event of failure of the structural connection, thereby preventing hydraulic pressure drop, said groove being constructed and arranged to be operatively engaged by a pulling tool for removing said annular surface from engagement with the shaft.

10. The device assembly according to claim 9, wherein an engagement length of said pulley web portion with the shaft is generally equal to a thickness of said pulley web portion.

11. The device assembly according to claim 9, wherein said pulley web portion includes an extending portion extending in the shaft axial direction and having said bore therethrough, thereby increasing an engagement area between the pulley and the shaft.

12. The drive assembly according to claim 9, wherein said structural connection is one of a welded and brazed connection.

13. The drive assembly according to claim 9, wherein said structural connection is one of a mechanical and adhesive connection.

14. The drive assembly according to claim 9, wherein said web portion is aligned with a pulley central axis.

15. A method of coupling a drive assembly to a drive shaft of a pulley driven device, the drive assembly including a hub machined from stock material or forged in the form of an annular body of ferrous metal having a groove in an external periphery thereof; a belt driven pulley in the form of ferrous sheet metal, the pulley including a web portion; a structural connection between the hub and the pulley web portion such that the hub is in fixed, abutted relation with the pulley web portion, the hub and the pulley web portion each having a bore therethrough, the method comprising machining the hub and pulley web portion bores in a single machining operation to define a generally continuous annular surface, coupling the drive assembly to the drive shaft such that said annular surface is in engagement with the drive shaft in an interference fitted manner.

* * * * *